(12) United States Patent
Roberge et al.

(10) Patent No.: US 10,687,460 B2
(45) Date of Patent: Jun. 23, 2020

(54) AIR-ASSISTED AGITATION FOR TANKS OF APPLICATION EQUIPMENT

(71) Applicant: CNH Industrial Canada, Ltd., Saskatoon (CA)

(72) Inventors: Martin J. Roberge, Saskatoon (CA); Joel Denis, Saskatoon (CA); Rex L. Ruppert, Benson, MN (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 227 days.

(21) Appl. No.: 15/652,676

(22) Filed: Jul. 18, 2017

(65) Prior Publication Data

US 2019/0021221 A1    Jan. 24, 2019

(51) Int. Cl.
| | |
|---|---|
| *A01C 15/00* | (2006.01) |
| *B01F 15/00* | (2006.01) |
| *B01F 15/04* | (2006.01) |
| *B01F 15/02* | (2006.01) |
| *B01F 13/02* | (2006.01) |
| *B01F 13/00* | (2006.01) |
| *B65G 53/42* | (2006.01) |
| *A01C 7/08* | (2006.01) |
| *A01C 15/04* | (2006.01) |

(52) U.S. Cl.
CPC ........ *A01C 15/007* (2013.01); *B01F 13/0037* (2013.01); *B01F 13/0227* (2013.01); *B01F 13/0266* (2013.01); *B01F 13/0277* (2013.01); *B01F 13/0294* (2013.01); *B01F 15/00155* (2013.01); *B01F 15/00253* (2013.01); *B01F 15/028* (2013.01); *B01F 15/0412* (2013.01); *A01C 7/082* (2013.01); *A01C 15/04* (2013.01); *B65G 53/42* (2013.01)

(58) Field of Classification Search
CPC .................................................... A01C 15/007
USPC ................................................. 366/101, 107
See application file for complete search history.

(56) References Cited

U.S. PATENT DOCUMENTS

| | | | |
|---|---|---|---|
| 2,609,185 A | 9/1952 | Eisner | |
| 2,723,838 A * | 11/1955 | Peters | ................. B01F 13/0238 34/576 |
| 3,339,899 A | 9/1967 | Kauffman | |
| (Continued) | | | |

FOREIGN PATENT DOCUMENTS

EP          1693316          8/2006

*Primary Examiner* — David L Sorkin
(74) *Attorney, Agent, or Firm* — Rebecca L. Henkel; Rickard K. DeMille (57) ABSTRACT

The present invention is directed to an applicator having an agricultural product mechanical conveying system which transfers particulate material from one or more source containers to application equipment on demand, and meters the material at the application equipment. The conveying system includes a pneumatic agitation system operably connected to the tanks of the applicator to agitate the particulate material disposed within the tanks in order to reduce the formation of agglomerations and/or bridges of particles within the tanks. The pneumatic agitation system includes a number of nozzle connected to each tank that are in turn connected to a pressurized air source and a controller. The controller is operable to selectively cause pressurized air to flow into the tanks through the nozzles to agitate the particulate material positioned therein, thereby breaking up and agglomerations of material within the tanks.

8 Claims, 7 Drawing Sheets

(56) References Cited

U.S. PATENT DOCUMENTS

| | | | |
|---|---|---|---|
| 3,350,070 A * | 10/1967 | Dostrup | B28C 7/0481 |
| | | | 366/107 |
| 3,647,188 A * | 3/1972 | Solt | B01F 13/025 |
| | | | 366/107 |
| 3,713,564 A | 1/1973 | Cottrell | |
| 4,172,539 A | 10/1979 | Botkin | |
| 4,693,394 A | 9/1987 | Martin, Jr. et al. | |
| 4,943,163 A * | 7/1990 | Steele | B01F 13/0261 |
| | | | 366/101 |
| 4,944,598 A * | 7/1990 | Steele | B01F 13/0261 |
| | | | 366/101 |
| 5,279,045 A * | 1/1994 | Odashima | B23P 19/003 |
| | | | 228/246 |
| 5,855,456 A | 1/1999 | Mueller | |
| 6,588,684 B1 | 7/2003 | Staples et al. | |
| 6,623,233 B2 | 9/2003 | Reveling | |
| 8,646,664 B2 | 2/2014 | Hamel et al. | |
| 9,266,688 B2 | 2/2016 | Hu et al. | |
| 9,446,362 B2 | 9/2016 | Stander | |
| 2005/0013193 A1 * | 1/2005 | Murphy | B05B 7/1404 |
| | | | 366/107 |
| 2007/0090676 A1 | 4/2007 | White | |
| 2007/0210112 A1 | 9/2007 | Storci et al. | |
| 2008/0131235 A1 | 6/2008 | Laidig et al. | |

* cited by examiner

AIR-ASSISTED AGITATION FOR TANKS OF APPLICATION EQUIPMENT

FIELD OF THE DISCLOSURE

The present invention relates generally to agricultural equipment, and, more particularly, to an agricultural product delivery system on an application implement, such as a planter or fertilizer application equipment, for applying particulate material such as seed, fertilizer, herbicide or insecticide in a field, either as a surface application or deposited in the soil to improve soil quality.

BACKGROUND OF THE DISCLOSURE

Agricultural product delivery systems are known to utilize various mechanisms, including mechanical and pneumatic systems, i.e., a flow of air, to assist in the delivery and movement of particulate material or product such as fertilizer, seed, insecticide or herbicide from a product supply chamber through an interior passage provided by a series of elongate tubes which extend from the product supply chamber to a product applicator that places the product on or in growing medium, such as soil. Such agricultural product delivery systems are commonly employed in planters, air drills, fertilizer and pesticide applicators and a variety of other agricultural implements.

Agricultural implements that employ an agricultural product delivery system are known to have a particulate material supply source such as one or more tanks that are loaded with the particulate material or materials to be applied. The tanks have or are associated with a metering device, which typically consists of a rotating element, which meters the particulate materials from the tanks into a set of distribution channels, such as conduits, hoses, etc., for application to the farm field. In most systems, a pneumatic source such as a fan or blower provides air to convey and distribute material through the distribution channels. Once the metering of particulates is done and the mix of air and particulates is in the distribution channels, the solid concentration should remain nearly constant and in dilute phase.

Systems as described have provided certain advantages and have worked acceptably in some aspects, but are not without disadvantages, inefficiencies or inconveniences. For example, it often occurs in the material supply source, such as a tank, that the material to be distributed via the system becomes agglomerated within the tank, such as by forming bridges across the tank, that prevent the material from being distributed.

In order to alleviate the problems associated with the agglomeration of the material within the tank, many types of mechanical agitators have been developed. These agitator are positioned within the tank and can be operated to agitate the material and break up any agglomeration or bridges of the material that have formed within the tank. However, as the placement of the mechanical agitators within the tank limits their ability to agitate material that is not immediately adjacent the agitator, in certain situations all agglomerations and bridges cannot be broken up effectively, or to distribute material that has an uneven horizontal profile due to previous sectional control.

Further, when the material within the tank drops below a certain level, it is often difficult to move the remaining material within the tank into a position where the material can exit the tank, which requires that the tank be manually cleaned and/or emptied at the end of a run. The mechanical agitators are unable to assist with this task as the remaining material rest outside of the operational volume that can be affected by the agitators, and may hinder the process by obstructing areas where the remaining material is positioned within the tank.

What is needed in the art is an agricultural product including an agitation system for the tanks of the application that addresses these issues to improve efficiency and convenience of the applicator without further complicating its construction, such as the mechanical drives of and associated physical interference of prior art rotary agitators.

SUMMARY OF THE DISCLOSURE

According to one aspect of the present disclosure, an applicator includes an agricultural product conveying system which transfers particulate material from one or more source containers to application equipment on demand, and meters the material at the application equipment. The pneumatic or mechanical conveying system employs longitudinal tubes or conduits that operate pneumatically with a pressurized air flow and/or mechanically with mechanical devices to move and mix the particulate material from one of the source containers or tanks along the conveying system. In the conveying system, the different types of particulate materials are blended, such as within a rotary distributor, and delivered to the distribution nozzles for discharge from the applicator. The conveying system has a simplified construction and operation in comparison to prior art systems.

The conveying system includes a pneumatic agitation system operably connected to the tanks of the applicator to agitate the particulate material disposed within the tanks in order to reduce the formation of agglomerations and/or bridges of particles within the tanks or to distribute the material during sectional control. The pneumatic agitation system includes a number of nozzles connected to each tank that are in turn connected to a pressurized air source and a controller. The controller is operable to selectively cause pressurized air to flow into the tanks through the nozzles to agitate the particulate material positioned therein, thereby breaking up any agglomerations of material within the tanks. The positioning of the nozzles enables the air flows from the nozzles to reach all internal areas of the tank in order to access material across the entire interior of the tank. Due to the configuration of the nozzles, the pneumatic agitation system can be operated at the end of a run in order to effectively clean out the particulate material remaining within the tank after the run has been completed.

According to another aspect of the invention, an agricultural product delivery system includes at least one particulate material supply compartment, at least one particle delivery unit for applying particulate material from the supply compartment, a conveying system providing a flow of particulate material from the at least one particulate material supply compartment to the at least one particle delivery unit and a pneumatic agitation system operably connected to the at least one compartment.

According to another aspect of the invention, pneumatic agitation system for use with an agricultural product delivery system, the pneumatic agitation system includes a compressor, a number of nozzles adapted to be engaged with at least one particulate material supply compartment of the agricultural product delivery system and operably connected to the compressor and a controller operably connected to the compressor and the number of nozzles.

According to a further aspect of the present invention, a method of agitating a particulate material within at least one compartment containing the particulate material for applying the particulate material in a field includes providing a pneumatic agitation system operably connected to the at least one compartment, the pneumatic agitation system including a compressor and a number of nozzles disposed on the at least one compartment and operably connected to the compressor and operating the pneumatic agitation system to agitate the particulate material within the at least one compartment.

Numerous additional objects, aspects and advantages of the present invention will be made apparent from the following detailed description taken together with the drawing figures.

BRIEF DESCRIPTION OF THE DRAWINGS

The drawings illustrate the best mode of practicing the present disclosure.

In the drawings.

DETAILED DESCRIPTION OF THE DISCLOSURE

Figure 1:
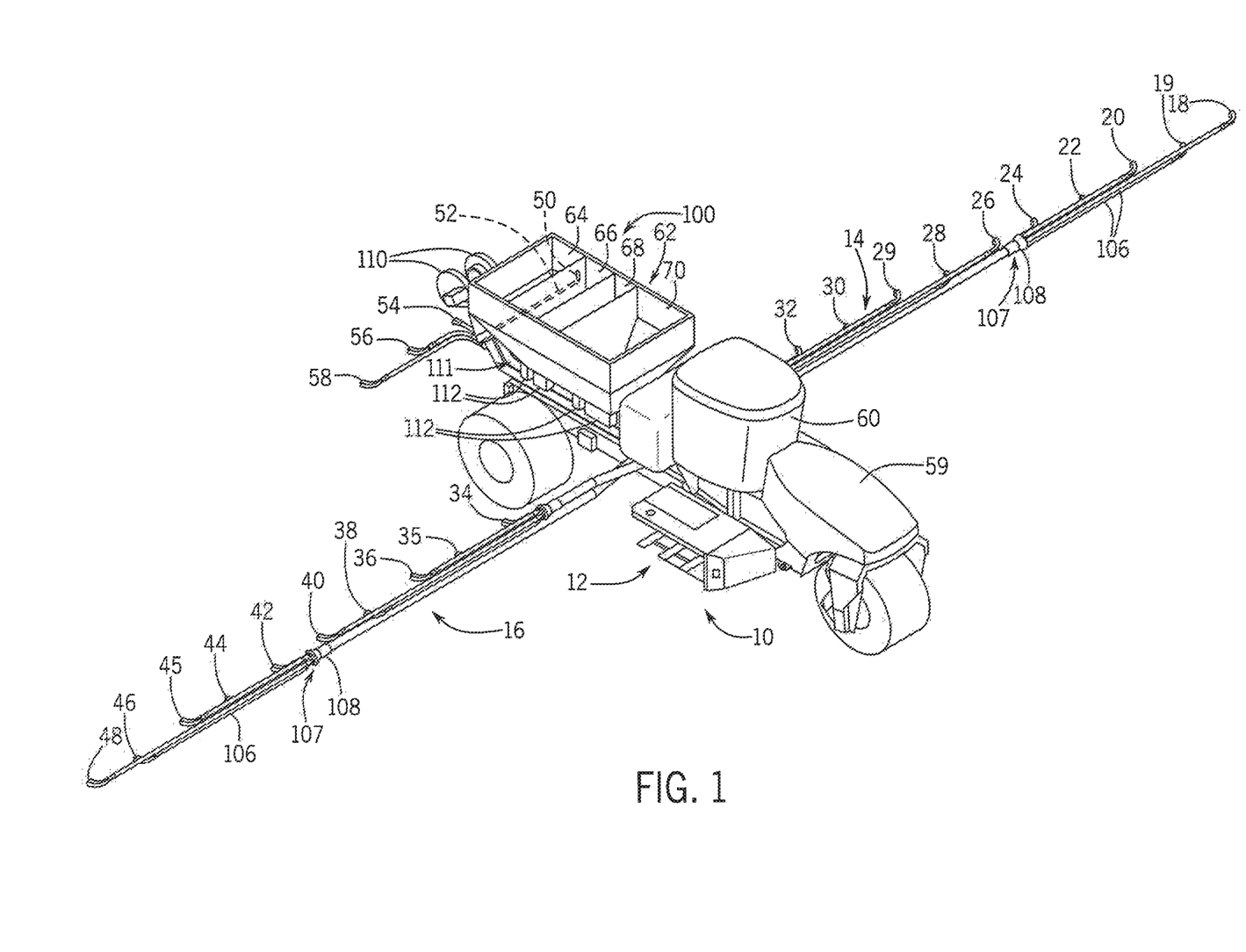
FIG. 1 is an isometric view of an agricultural application implement, in the nature of a fertilizer spreader, having a conveying system according to one exemplary embodiment of the invention.
Figure 2:
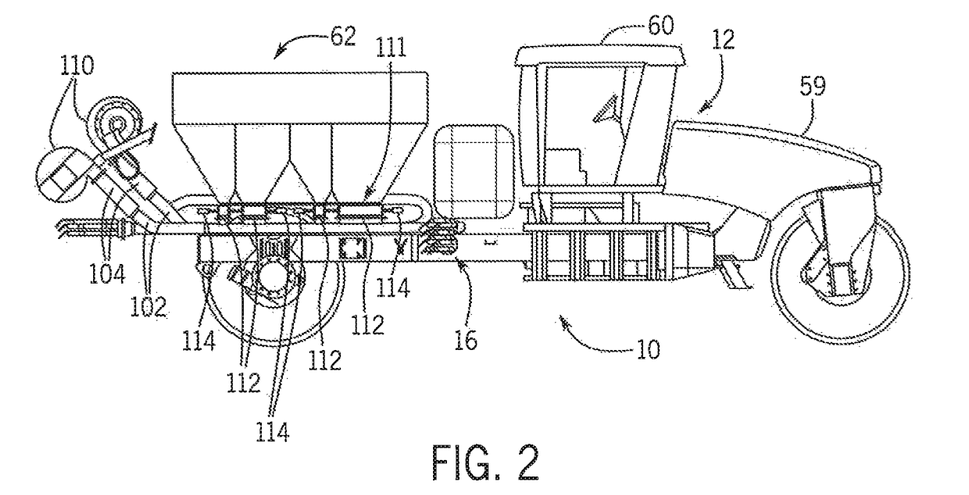
FIG. 2 is a side elevation view of the fertilizer spreader shown in FIG. 1
Figure 3:
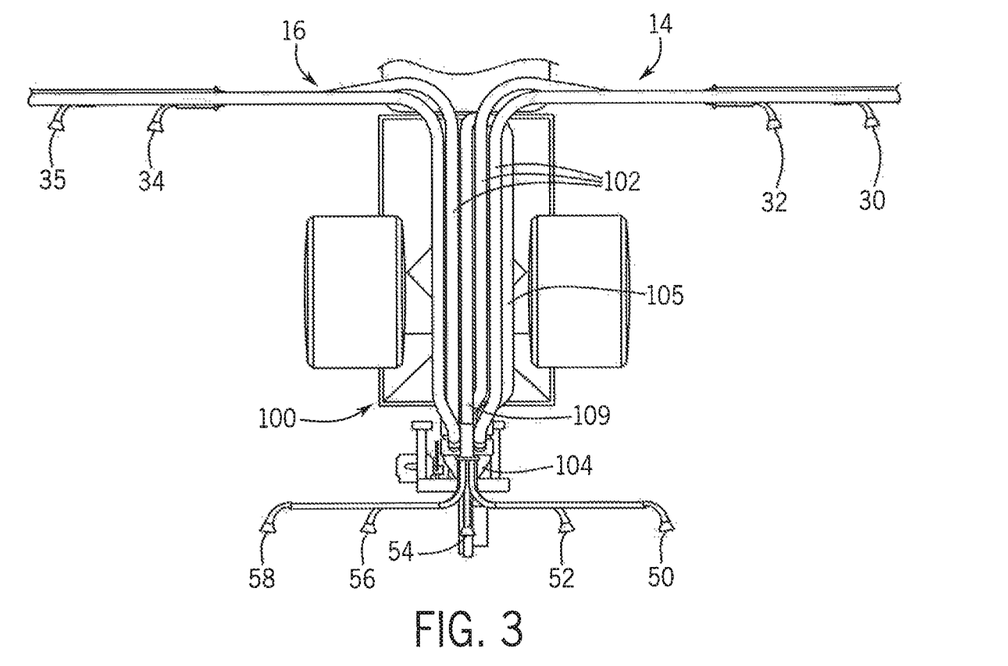
FIG. 3 is bottom plan view of the conveying system according to another exemplary embodiment of the invention.

Referring now to the drawings, and more particularly to FIGS. 1-3, there is shown an agricultural application implement 10, on which a pneumatic conveying system 100 can be used. In the exemplary embodiment shown, application implement 10 is a granular fertilizer applicator 10. As is known in the art, applicator 10 generally includes a large tired transport unit 12 such as truck or tractor, and laterally extending particle delivery booms 14 and 16, which may be pivoted to a stowed position close to the implement for storage or transport. Each boom 14, 16 includes a plurality of boom tubes or conduits terminating at the outboard end in a particle delivering unit, which for fertilizer applicator 10 are a spreading outlet or nozzle. In the exemplary embodiment shown, boom 14 includes ten nozzles 18, 19, 20, 22, 24, 26, 28, 29, 30 and 32; and boom 16 includes ten nozzles 34, 35, 36, 38, 40, 42, 44, 45, 46 and 48. Additionally, at the back of applicator 10 there are five rear nozzles 50, 52, 54, 56 and 58 to provide full and complete coverage across the width of implement 10, including the area between the inboard-most nozzles 32 and 34 of booms 14, 16. Implement transport unit 12 is self-propelled by an engine in an engine compartment 59 and includes an operator cab 60. In the exemplary embodiment shown, an uncovered tank 62 includes compartments 64 and 70 for carrying particulate material to be distributed to and disbursed by nozzles 18-58. Further smaller compartments 66, 68 can be provided to supply micro-nutrients or other materials to nozzles 18-58. The supply of particulate in compartments 64, 66, 68, 70 is replenished periodically from a still larger volume supply vehicle (not shown).

Fertilizer applicator 10 is illustrative of the types of equipment for which the conveying system 100 can be used; however, it should be understood that the conveying system 100 may, of course, be employed in conjunction with other agricultural equipment such as tillage, seeding or planting devices, and is useful in distributing particulate material other than fertilizer.

Looking now at FIGS. 1-3, in the illustrated exemplary embodiment the compartments 64-70 of the tank 62 are each disposed directly above the conveying system or assembly 100, which is a pneumatic conveying system 100. The system 100 includes five large diameter supply lines 102 that extend from a plenum 104 at one end, under the compartments 64-70 and terminate at the booms 14, 16 or at the rear nozzles 50-58. At the booms 14, 16, the supply lines 102 and the particulate material or product transported therein can be split by a suitable distribution structure or mechanism 107, such as a horizontal rotary distributor(s) 108, among or into a number of secondary or smaller supply lines 106 that are connected to the nozzles 18-58.

To collect and drive the particulate material along the lines 102, in the illustrated embodiment one or more fans 110 are operably connected to the plenum 104 opposite the lines 102. The air flow from the fans 110 is directed from the fans 110 through the plenum 104 and into the respective lines 102 as a result of the structure of the plenum 104. After the air flow passes through the one or more plenums 104 connected to the one or more fans 110 and collects entrains the particulate material from the compartments 64-70 in a manner to be described, the air flow continues to flow along each of the four (4) large diameter lines 102 that make approximately a 90° turn to connect to the booms 14, 16.

In order to spread the particulate material/product over/ onto the center section over which the machine 10 passes, a large line 102 must move product to the rear nozzles 50-58 where there is no interference by the machine 10 on the spread pattern. To accomplish this a line 102 carrying only air is added on the side of the machine 10 and has a forward section 105 that extends from the plenum 104 to the front of the machine 10. At the front of the machine 10, one line 102 turns 180° and has a rearward section 109 that passes beneath the compartments 64-70 where the line 102 collects the particulate material/product and transports the product to the nozzles 50-58 at the rear of the machine 10.

In an alternative exemplary embodiment, it is contemplated that the conveying system 100 can be formed with one or more mechanical conveyors (not shown) take the form of one or more augers (not shown) that are disposed within the lines 102 and encircle the auger(s) along their length. The augers are each operably connected to a motor (not shown) that causes the augers to rotate within the respective lines 102, moving the particulate material in conjunction with the air flow through the lines 102. The operation of the motor can be controlled to control the speed of rotation of the augers, either collectively or independently from one another, such that the speed of the conveying system 100 can be varied as desired but not to meter the product(s).

Figure 4:
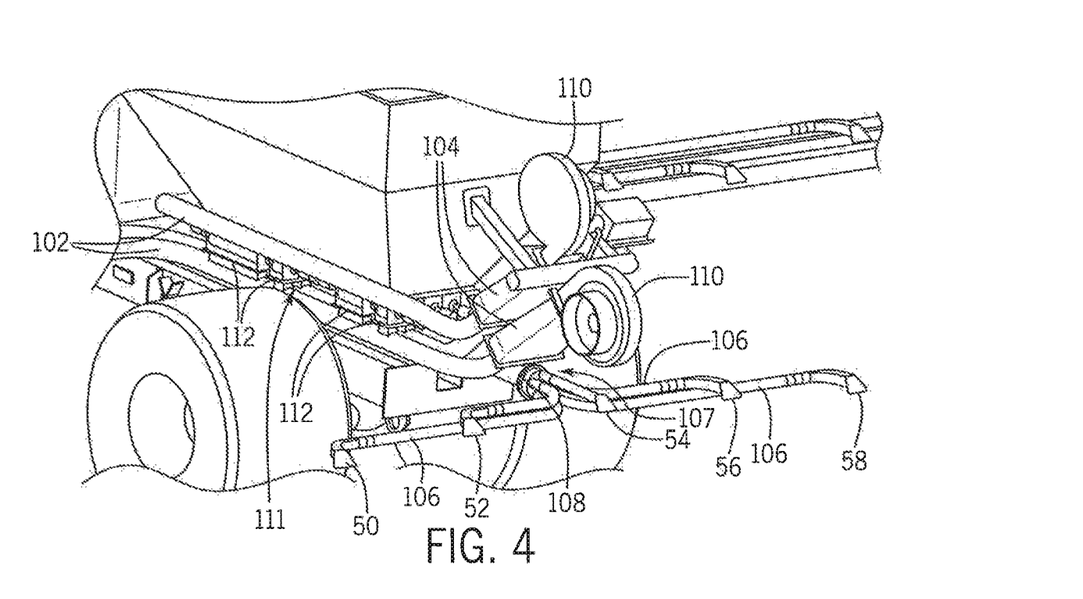
FIG. 4 is an isometric view of a conveying system on a fertilizer spreader according to another exemplary embodiment of the invention.

Looking now at FIGS. 1, 2 and 4, in the illustrated exemplary embodiment the plenums 104 provide airflow from the fans 110 to all five lines 102 of the system 100, with one plenum 104 connected to the two (2) outside lines 102, with the other plenum 104 supplying the air flow to the center three (3) lines 102. The lines 102 are split in this fashion because of the higher pressure drop associated with the outermost lines 102 as a result of their length. With only the two higher pressure lines supplied by one plenum 104, it allows the fan 110 connected to the longer lines 102 to supply a higher pressure airflow through these lines 102 since less airflow is required for two lines 102 vs three lines 102. In the illustrated exemplary embodiment, the two fans 110 and associated plenums 104 are stacked vertically with respect to one another. However a different configuration can be utilized where the fans 110 and plenums 104 are arranged in the same horizontal plane in order to minimize the space requirements, with the plenums 104 also optionally being rotated 90° from the illustrated configuration.

Referring now to FIGS. 1-4, in the illustrated exemplary embodiment the particulate material/product contained within each of the compartments 64-70 of the tank 62 is introduced into the airflow in the various lines 102 via a product metering system 111, that is formed of a number of metering devices 112 that function to meter the product flowing from the compartments 64-70 into each line 102.

In the exemplary embodiment of FIGS. 1, 2 and 4, the metering devices 112 forming the metering system 111 are disposed in sets 114 located directly beneath each compartment 64-70 of the tank 62, with each set 114 of metering devices 112 associated with one compartment 64-70 of the tank 62. The metering devices 112 in each set 114 are connected in alignment with the compartments 64-70 and the lines 102 to enable the particulate material to be dispensed from the metering devices 112 into the lines 102. The number of metering devices 112 forming each set 114 corresponds to the number of lines 102 in the conveying system 100, such that the particulate material from each compartment can be dispensed into each line 102 utilizing the same set 114 of metering devices 112.

In addition, in the illustrated exemplary embodiment of FIG. 4, while the width of the metering devices 112 in each set 114 is the same in order to correspond to the size of the lines 102, the length of the metering devices 112 in each set 114 is dependent of the size of the compartment 64-70 associated with the set 114, and/or tank and the type of particulate material held within that compartment 64-70. For example, the larger compartment 70 of the tank 62 can contain urea that will be metered at a higher rate per acre, thus requiring longer metering devices 112 in the set 114 associated with the compartment 70 to avoid excessive operational speeds for the metering devices 112. In contrast, smaller compartments 64,66, 68 are configured to retain micro-nutrients therein, such as zinc, for example, which are normally spread at a lower rate per acre have smaller metering device 112 in the sets associated with these compartments 64, 66, 68. The positioning of compartments 64-70 of different sizes within the tank 62 is selected to avoid physical interference between the operating parts of the metering devices 112.

Looking now at FIGS. 5-8, the applicator 10 includes a pneumatic agitator system 116 that is connected to the compartments 64-70. The agitator system 116 includes a number of air nozzles 118 affixed within apertures 120 disposed at various locations on each of the compartments 64-70, such as at angled and and/or horizontal orientations to the compartments 64-70, or combinations thereof. The air nozzles 118 are each connected via hoses 122 to a pressurized air source 124, such as an air accumulator 126 connected to a compressor 127 or other pressurized air/gas flow generator, such as the fans 110, that is connected to the air accumulator 126. Each air nozzle 118 includes an outlet 128 secured within the aperture 120 in order to direct the air flow into the compartment 64-70 to which the air nozzle 118 is attached. The outlet 128 extends outwardly from a housing 130 in which is disposed a valve 132, such as a solenoid valve 134. The valve 134 includes a connector 138 that can be operably connected, such as via a wired connection (not shown) to a controller 140 that in one exemplary embodiment is located within the operator cab 60 of the applicator 10. The housing 130 also include an inlet 142 located generally opposite the outlet 128 that is connected to a hose 122 to supply an air flow to the air nozzle 118. The hose 122 can additionally have a manual inlet valve 144 located directly on the hose 122 to manually control the operation of the air nozzle 118.

The air nozzles 118 can be positioned on various surfaces of the compartments 64-70 in order to maximize the agitation provided by the pneumatic agitation system 116. As shown in the exemplary embodiment of FIG. 6, apertures 120 and corresponding air nozzles 118 are disposed in the front surface 146, rear surface 148 and opposed side surfaces 150,152 of the compartments 64, 66, 68 and 70. In addition, the apertures 120 and corresponding air nozzles 118 can be positioned on different levels 200, 202 (FIG. 8) on each surface 146, 148,150,152 of the compartments 64-70. In this manner, the air flows entering the compartments 64-70 via the air nozzles 118 disposed in the apertures 120 can be directed at all areas of the interior of the compartments 64-70, thus ensuring that the particulate materials held therein can be effectively agitated regardless of the position of the particulate material within the compartments 64-70. Further, in this exemplary embodiment, the air nozzles 118 disposed at a top level on the compartments 64-70 can be operated to agitate the particulate material within the compartments 64-70 to avoid the formation of uneven levels of the particulate material at the tops of the piles (not shown) of the materials disposed within the compartments 64-70, particularly during sectional control of the system 100. Additionally, the operation of the air nozzles 118 to agitate the particulate materials within the compartments 64-70 can delay the time at which a compartment(s) 64-70 will starve of the particulate material contained therein.

In addition to the placement of the air nozzles 118 at various locations and levels on the compartments 64-70, the operation of the air nozzles 118 can be varied in order to direct air flow at the particulate material within the compartments 64-70 from different directions by operating different air nozzles 118 at different times. Further, the air nozzles 118, either in conjunction with or separately from the selective operation of the various air nozzles 118 can be operated to pulse the air flow from the same or different air nozzles 118 into the compartments 64-70 thus providing enhanced agitation capabilities to the pneumatic agitating system 116. Also, either with the operation of different air nozzles 118 and/or pulsing of the air flow from the air nozzles 118, the pressure of the air flow directed into the compartments 64-70 can be done at a constant pressure or varied to increase or decrease the pressure from one or more air nozzles 118 depending upon the agitation requirements for the pneumatic agitation system 116. In one exemplary embodiment, the burst of air into the compartments 64, 66, 68 and/or 70 can have a duration of between 0.25 seconds and 2.0 seconds, or 0.50 seconds, with a pressure of approximately 100 psi, with intervening periods of no air flow of 0.1 seconds to 0.5 seconds when the system 116 is in an agitation mode. The short burst of air avoid an excessive increase in the air pressure into and/or within the compartments 64-70, which can already be pressurized. This is due to the ability of the small pressurized air quantity contained within the air bursts to leaks out of the compartments 64-70 through the metering devices 112. In addition, the pneumatic agitation system 116 can be employed with or without any other agitation mechanisms, such as a mechanical agitation system (not shown).

Figure 5:
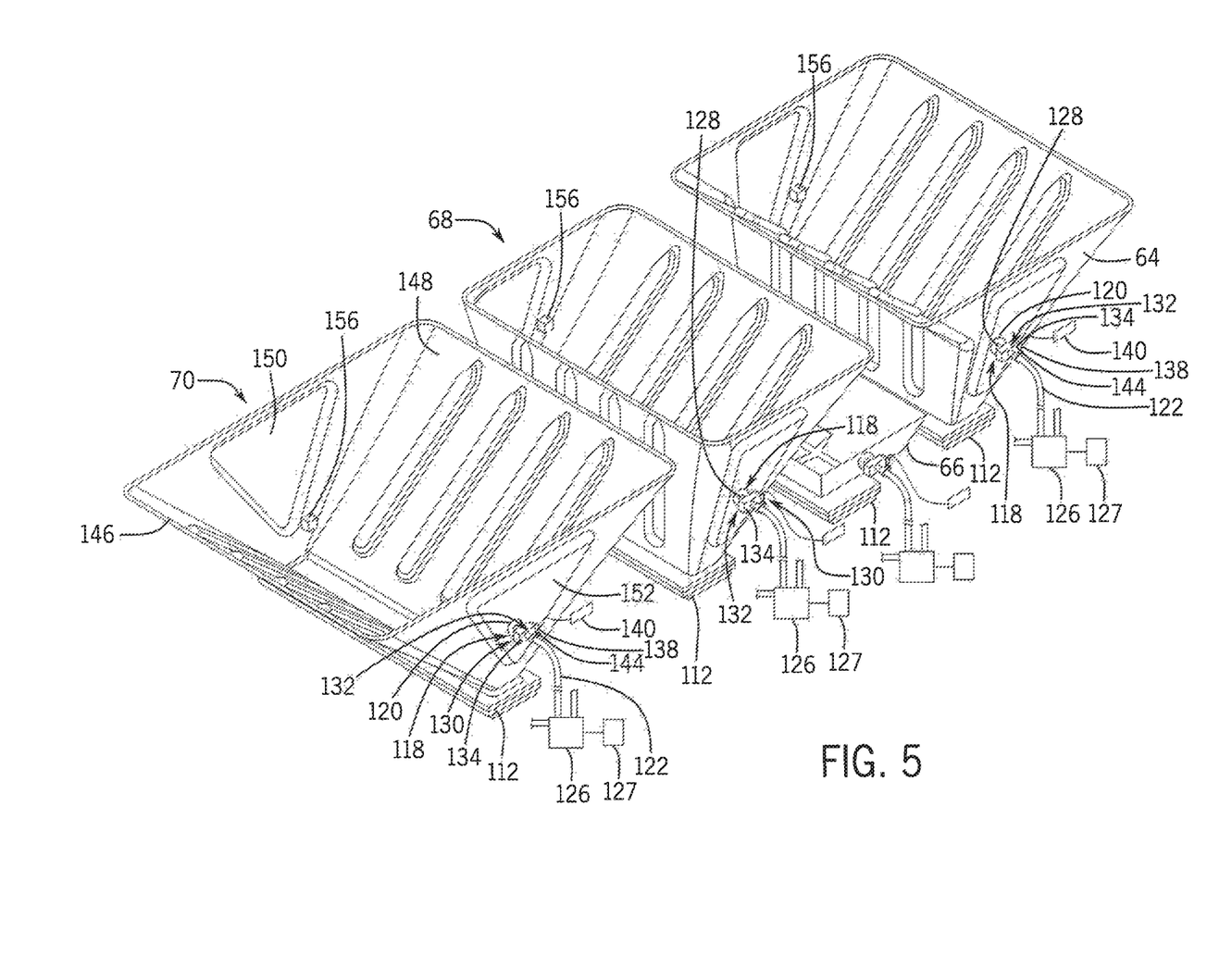
FIG. 5 is a partially broken away, isometric view of the individual tank compartments and pneumatic agitation system according to an exemplary embodiment of the invention.
Figure 6:
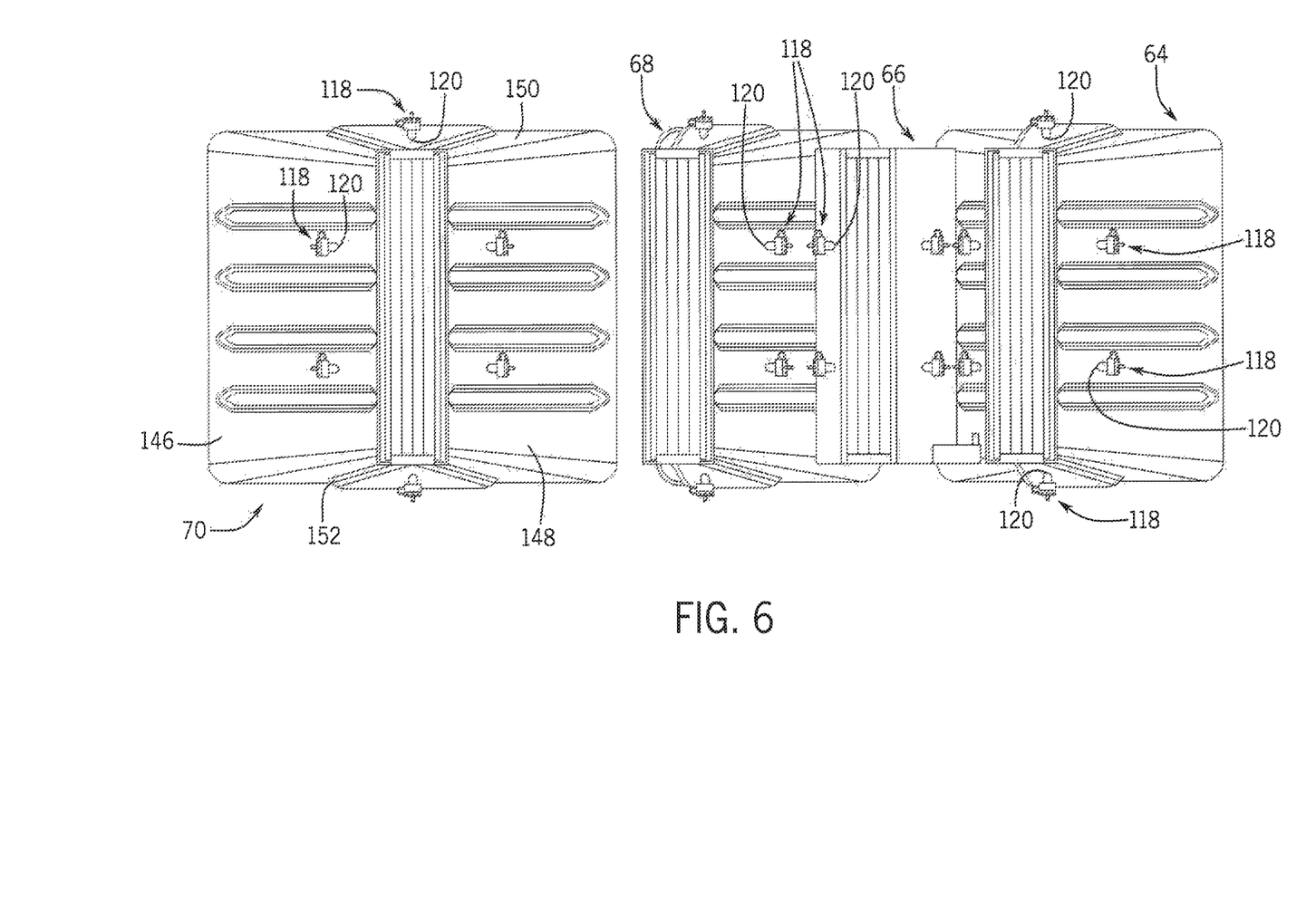
FIG. 6 is a bottom plan view of the compartments and pneumatic agitation system of FIG. 5.
Figure 7:
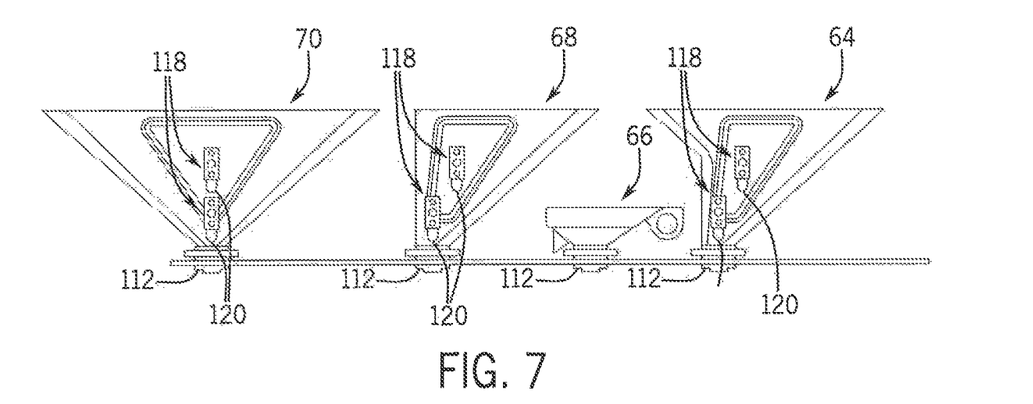
FIG. 7 is side elevation view of the compartments and pneumatic agitation system of FIG. 5.
Figure 9:
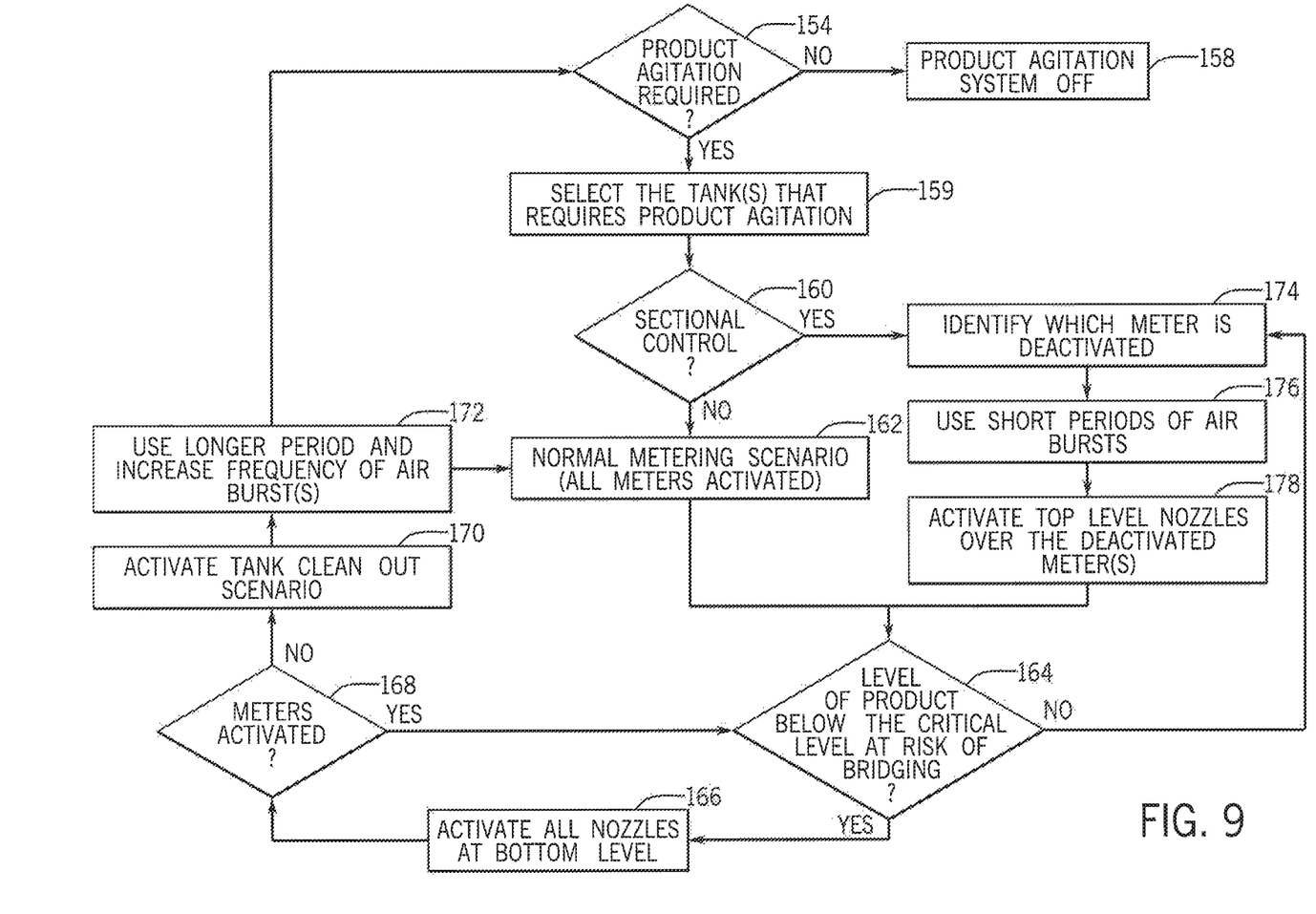
FIG. 9 is flowchart illustrating one exemplary embodiment of the method of operation of the pneumatic agitation system of the invention.

Referring now to FIG. 9, in one exemplary method of operation of the pneumatic agitation system 116, in decision block 154 initially the controller 140 determines if any product agitation is required. This determination can be made in one embodiment using one or more ultrasonic sensors 156 (FIG. 5) disposed within the compartments and connected to the controller 140. The sensors 156 operate to indicate the level of the particulate material within the compartments 64-70 and transmit this information to the controller 140. Alternatively, or in conjunction with the sensors 156, the activation of the system 116 can be accomplished in any suitable manner, such as by utilizing a time-based agitation timer, such as to operate the system 116 on a periodic basis, e.g. operating the system 116 to deliver 5 bursts every 10 seconds, to operate the system 116 based on manual input from the operator, among any other suitable operational control mechanism. If in block 154 the controller 140 determines that the no agitation of the particulate materials is required, the system 116 proceed to block 158 and turns off the agitation system 116.

Alternatively, if agitation is required, using the information from the sensors 156, the controller 140 will determine in block 159 the compartments 64-70 that require agitation. In addition, in decision block 160 the controller 140 through an operable connection (not shown) to the control systems (not shown) of the applicator 10 will ascertain whether the applicator 10 is operating under sectional control, i.e., if one or more of the compartments 64-70 are not currently being utilized to distribute the particulate material(s) contained therein.

Figure 8:
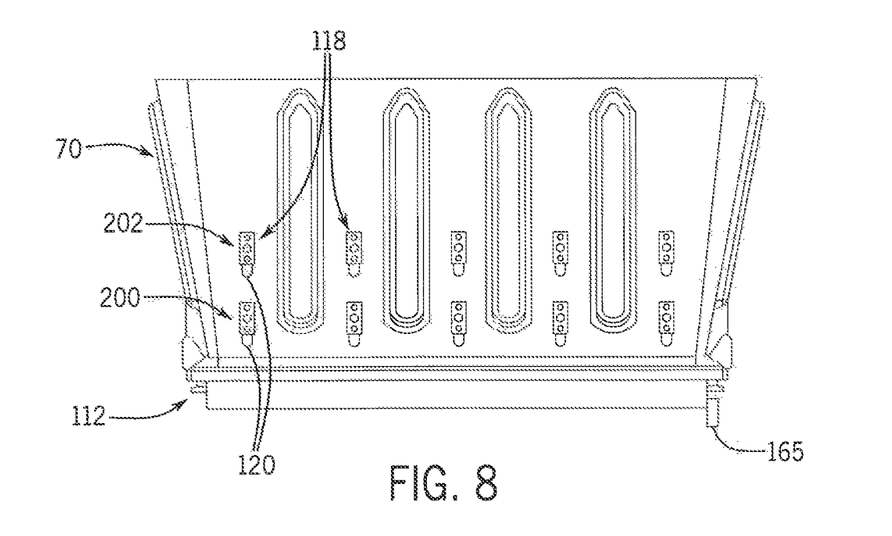
FIG. 8 is a front elevation view of one compartment and pneumatic agitation system of FIG. 5.

If the controller 140 determines in block 162 that no sectional control is in effect, and that all particulate materials are being metered from all compartments 64-70, the controller 140 proceeds to decision block 164 to determine, e.g., via the sensors 156, whether the level of particulate material in one or more of the compartments 64-70 is below the critical level where the particulate material is at significant risk for bridging within the compartment 64-70. If so, the controller 140 proceeds to activate all of the air nozzles 118 associated with the compartments 64-70 having critical or below critical particulate material levels in block 166 to break up any already-formed bridges of the material and/or to prevent any bridges from forming. The controller 140 then proceeds to block 168 to determine if any of the metering devices 112 are actively metering the materials from the compartments 64-70, such as by utilizing a sensor 165 (FIG. 8) operably connected to the metering device 112 and the controller 140.

If no metering devices 112 are determined to be active on any compartment 64-70 in block 168, such that the applicator 10 is no longer distributing any particulate materials, the controller 140 proceed to block 170 and performs an automated tank clean out function where the air nozzles 118 in each compartment 64-70 are activated to move all remaining materials within the compartments 64-70 into a position where the materials can be removed entirely from the compartments 64-70. This function, as illustrated in an exemplary embodiment, in block 172 involves the operation of the air nozzles 118 in each compartment 64-70 for longer durations, with increased pressures and/or increased frequencies of the bursts in order to create a highly turbulent environment within the compartments 64-70 to dislodge and remove the materials from the compartments 64-70. Additionally, a bypass gate (not shown) positioned on the compartments) 64-70 can be opened during this clean out function to avoid having to operate the metering devices 112. Upon completion of the tank clean out function, the controller 140 returns to block 154 to determine the next instance when operation of the pneumatic agitation system 116 is required to agitate particulate material(s) disposed within the compartments) 64-70.

However, if at least some of the metering device 112 are active, such that the applicator 10 is still dispensing particulate material(s), the controller 140 returns to block 164. In block 164, whether from block 162 or from block 168, if the controller 140, via the sensors 156, does not find any critical particulate material levels in the compartments 64-70, the controller 140 proceeds to block 174 and identifies which compartments 64-70 have inactive metering devices 112, as is the case when the applicator 10 is operated under sectional control, as determined in block 160. The controller 140 then moves to block 176 to operate the air nozzles 118 associated with each of the compartments 64-70 to emit short bursts of pressurized air into the compartments 64-70, thereby agitating the particulate material within the compartments 64-70. Additionally, the air nozzles 118 can be operated in any suitable or desired manner to agitate the particulate material(s), using higher or lower pressure air busts, longer or shorter bursts, and/or alternating or stagger bursts of air from different air nozzles 118 for an individual compartment 64-70. However, in block 178 for any compartments 64-70 with a non-operating metering device 112, the controller 140 operates the top level air nozzles 118, or all of the nozzles 118 on each level.

After operating the air nozzles 118 in blocks 176 and 178, the controller 140 moves back to decision block 164 in order to provide continuous monitoring and agitation of the particulate materials within the compartments 64-70 until operation of all of the metering devices 112 is ceased.

While the conveying system 100 including the pneumatic agitation system 116 disclosed so far herein have been primarily with respect to pneumatic and/or mechanical fertilizer application equipment or applicator commonly referred to as a "floater", it should be understood that the advantages from the conveying system 100 including the pneumatic agitation system 116 disclosed herein can be obtained on other types of equipment for applying particulate materials in a field. Planters of various types are known to include an applicator unit, such as a drill or seeder, and may include an air cart having one or more bulk tanks carrying fertilizer and/or seeds to be planted. The conveying system 100 including the pneumatic agitation system 116 disclosed herein can be provided on the planter, and one or more air/seed inductors on the air cart. If the air cart is then used with a planter of a different type, or with another type of particle application equipment, adjustments to the conveying system 100 including the pneumatic agitation system 116 can be made without the need to adjust the air/seed inductor assembly on the air cart. Accordingly, switching from one crop to another crop or from one planter to another planter does not require major adjustment of the air/seed inductor assembly on the air cart.

In using a conveying system 100 as disclosed herein, a variety of materials can be applied by a variety of different implements. The particulate material to be applied is contained in one or more compartments. The particulate material or materials are supplied from the tanks to the conveying system 100 wherein the material or materials are conveyed to one or more particle injectors while being intermixed with one another. At the particle injector the conveyed product or products are provided in a metered flow and transferred to one or more particle delivery unit, which can be a broadcast spreader, seeder for depositing seeds or other materials across the surface of soil, a row opener unit for depositing seeds or other material in rows, or the like.

Various other alternatives are contemplated as being within the scope of the following claims particularly pointing out and distinctly claiming the subject matter regarded as the invention.

We claim:

1. An agricultural product delivery system, comprising:
   at least one particulate material supply compartment;
   at least one particle delivery unit for applying particulate material from the supply compartment;
   a conveying system providing a flow of particulate material from the at least one particulate material supply compartment to the at least one particle delivery unit;
   a pneumatic agitation system operably connected to the at least one compartment;
   a compressor; and
   a plurality of nozzles disposed on the at least one particulate material supply compartment, the plurality of nozzles operably connected to the compressor, each nozzle of the plurality of nozzles positioned on and against a portion of a surface positioned to contact particulate material in the particulate material supply compartment,
   wherein the at least one particulate material supply compartment comprises a plurality of particulate material supply compartments, and wherein at least one particulate material supply compartment of the plurality of particulate material supply compartments comprises:
   a pair of tapered opposing sidewalls;
   a pair of triangular opposing sidewalls; and
   at least one nozzle of the plurality of nozzles positioned on at least one sidewall of the pair of tapered opposing sidewalls, and at least one other nozzle of the plurality of nozzles positioned on at least one sidewall of the pair of triangular opposing sidewalls, and
   wherein each tapered opposing sidewall includes a plurality of spaced-apart ridges, and wherein the at least one nozzle of the plurality of nozzles is positioned between two of the spaced-apart ridges.

2. The agricultural product delivery system of claim 1, wherein the plurality of nozzles are oriented horizontally with respect to the at least one particulate material supply compartment.

3. The agricultural product delivery system of claim 1, wherein the plurality of nozzles are oriented at an angle with respect to the at least one particulate material supply compartment.

4. The agricultural product delivery system of claim 1, further comprising:
   a plurality of first nozzles disposed on the at least one particulate material supply compartment; and
   a plurality of second nozzles disposed on the at least one particulate material supply compartment and spaced vertically on the at least one particulate material supply compartment from the plurality of first nozzles.

5. The agricultural product delivery system of claim 1, further comprising a controller operably connected to the compressor and the plurality of nozzles.

6. The agricultural product delivery system of claim 5, wherein each nozzle of the plurality of nozzles comprise:
   an inlet operably connected to the compressor;
   an outlet disposed at least partially within the at least one particulate material supply compartment;
   a valve disposed between the inlet and the outlet; and
   a connector operably connected to the valve and to the controller.

7. The agricultural product delivery system of claim 6, wherein the valve is a solenoid valve.

8. The agricultural product delivery system of claim 6, further comprising:
   a hose interconnecting the inlet with the compressor; and
   an inlet valve disposed on the hose to control a flow of air from the compressor into the inlet.

* * * * *